US008143732B2

(12) United States Patent  (10) Patent No.: US 8,143,732 B2
Algrain  (45) Date of Patent: Mar. 27, 2012

(54) STATIONARY GENSET POWER SYSTEM HAVING TURBO-COMPOUNDING

(75) Inventor: Marcelo C. Algrain, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 542 days.

(21) Appl. No.: 12/314,684

(22) Filed: Dec. 15, 2008

(65) Prior Publication Data

US 2010/0148518 A1  Jun. 17, 2010

(51) Int. Cl.
F02B 37/00 (2006.01)
(52) U.S. Cl. ........................................................ 290/1 A
(58) Field of Classification Search ................... 290/52; 60/597
See application file for complete search history.

(56) References Cited

U.S. PATENT DOCUMENTS

| | | | |
|---|---|---|---|
| 3,676,999 A | 7/1972 | Oldfield | |
| 3,961,199 A | 6/1976 | Bronicki | |
| 4,680,933 A | 7/1987 | Bozung et al. | |
| 4,745,754 A | 5/1988 | Kawamura | |
| 4,955,199 A * | 9/1990 | Kawamura | 60/608 |
| 4,958,497 A | 9/1990 | Kawamura | |
| 4,958,708 A * | 9/1990 | Kawamura | 60/608 |
| 5,074,115 A * | 12/1991 | Kawamura | 60/608 |
| 5,406,797 A | 4/1995 | Kawamura | |
| 5,678,407 A | 10/1997 | Hara | |
| 5,857,336 A * | 1/1999 | Paul et al. | 60/597 |
| 6,415,606 B1 | 7/2002 | Bowman et al. | |
| 6,931,850 B2 | 8/2005 | Frank et al. | |
| 7,047,743 B1 | 5/2006 | Stahlhut et al. | |
| 7,076,954 B1 | 7/2006 | Sopko, Jr. et al. | |
| 7,137,253 B2 | 11/2006 | Furman et al. | |
| 7,174,714 B2 | 2/2007 | Algrain | |
| 7,336,000 B2 * | 2/2008 | Stahlhut et al. | 290/52 |
| 7,383,684 B2 * | 6/2008 | Vuk | 60/606 |
| 7,886,522 B2 * | 2/2011 | Kammel | 60/280 |
| 7,891,185 B2 * | 2/2011 | Vuk | 60/608 |
| 7,893,554 B2 * | 2/2011 | Stahlhut et al. | 290/52 |
| 2006/0218923 A1 * | 10/2006 | Sopko et al. | 60/607 |
| 2007/0062191 A1 | 3/2007 | Furman et al. | |
| 2007/0277514 A1 | 12/2007 | Kammel | |
| 2008/0121218 A1 | 5/2008 | Algrain | |
| 2010/0018203 A1 * | 1/2010 | Richards | 60/598 |

FOREIGN PATENT DOCUMENTS

| | | | | |
|---|---|---|---|---|
| JP | 03172536 A | * | 7/1991 | |
| JP | 06108865 A | * | 4/1994 | |
| JP | 09021322 A | * | 1/1997 | |
| JP | 09021323 A | * | 1/1997 | |
| JP | 2008286016 A | * | 11/2008 | |

* cited by examiner

*Primary Examiner* — Joseph Waks
(74) *Attorney, Agent, or Firm* — Finnegan, Henderson, Farabow, Garrett & Dunner LLP

(57) ABSTRACT

A stationary genset power may have a combustion engine configured to produce a mechanical output, and a main generator driven by the combustion engine to convert a majority portion of the mechanical output to electricity directed to an external load. The stationary genset power system may also have a turbine fluidly connected to the combustion engine, a compressor operatively driven by the turbine to compress combustion air directed to the combustion engine, and a secondary generator operatively driven by the turbine to produce electricity directed to the external load. The stationary genset power system may further have a controller in communication with the primary and second generators. The controller may be configured to synchronize an electrical power output of the secondary generator with an electrical power output of the primary generator prior to connection of the secondary generator to the external load.

19 Claims, 1 Drawing Sheet

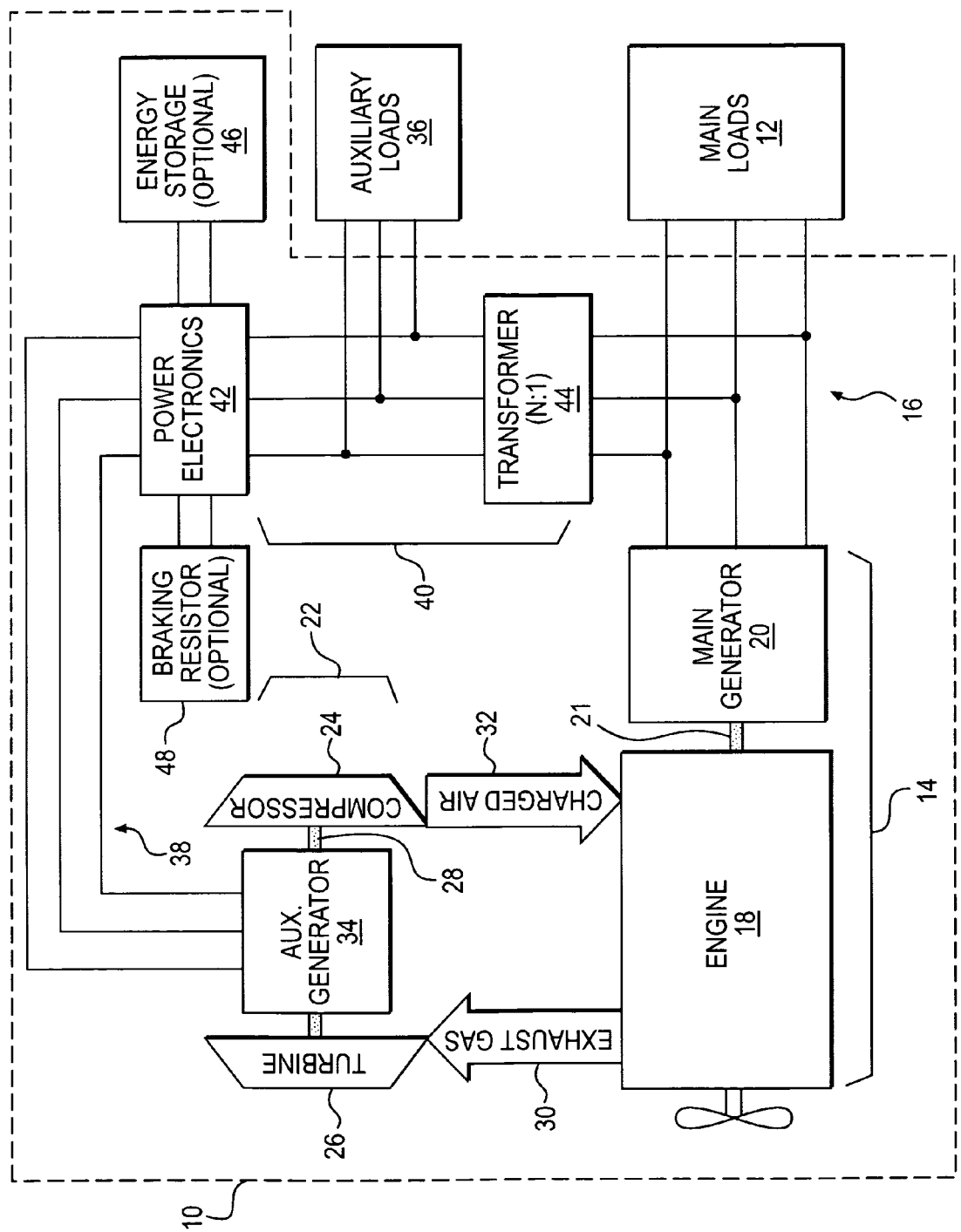

STATIONARY GENSET POWER SYSTEM HAVING TURBO-COMPOUNDING

TECHNICAL FIELD

The present disclosure relates generally to a generator set (genset) power system and, more particularly, to a stationary genset power system having turbo-compounding.

BACKGROUND

The primary purpose of a stationary generator set (genset) is to produce electrical power directed for external use. A genset typically includes a main generator coupled to and driven by a combustion engine. As a mixture of fuel and air is burned within the engine of the genset, a mechanical rotation is created that drives the main generator to produce electrical power. Power electronics associated with the main generator then condition the electrical power according to needs of an external load. Byproducts of the combustion process are exhausted to the environment.

An amount of mechanical power produced by the engine is directly related to an electricity output capacity of the genset. For this reason, gensets are often equipped with one or more turbochargers that are driven by exhaust to compress combustion air entering the engine. By forcing air into the engine, more air becomes available for combustion than could otherwise be drawn into the engine by motion of the engine's pistons. This increased supply of air allows for increased fueling, resulting in an increased mechanical power output and a corresponding increased electrically output of the generator. A turbocharged engine typically produces more mechanical power than the same engine without turbocharging.

Unfortunately, turbochargers do not remove all of the energy contained within an engine's exhaust prior to the exhaust being discharged to the atmosphere. Thus, upon discharge to the atmosphere, some amount of energy may be wasted in the form of heat and/or pressure. If this energy could be recuperated, efficiency of the genset may be improved.

An attempt to recuperate exhaust energy in a stationary genset application is disclosed in U.S. Pat. No. 7,047,743 (the '743 patent) issued to Stahlhut et al. on May 23, 2006. Specifically, the '743 patent discloses an engine/electric generator system having an internal combustion engine, and a primary electric generator driven by an output shaft of the engine to provide electrical power. The system also includes a turbocharger having a first turbine driven by exhaust gasses from the engine, and a compressor driven by the first turbine to provide inlet air to the engine. The system further includes a secondary turbine, and an exhaust line which communicates exhaust gas from the first turbine to an input of the secondary turbine. A secondary electric generator is driven by the secondary turbine. An electric power combining circuit combines electric power from the primary electric generator and the secondary electric generator, and delivers the combined electric power to a transmission line. In this manner, energy from the exhaust may be used to generate electric power through turbo-compounding.

Although the engine/electric generator system of the '743 patent may have improved efficiency, it may still be less than optimal. Specifically, the system of the '743 patent requires a dedicated secondary turbine located downstream of and inline with the primary turbine to drive the secondary generator. The dedicated secondary turbine and associated ducting may increase a cost and a size of the system, and require complex controls for proper speed regulation of the secondary generator.

The stationary genset power system of the present disclosure addresses one or more of the problems set forth above and/or other problems of the prior art.

SUMMARY

In one aspect, the present disclosure is directed toward a stationary genset power system. The stationary genset power system may include a combustion engine having an air inlet and an exhaust outlet and being configured to produce a mechanical output, and a main generator driven by the combustion engine to convert a majority portion of the mechanical output to electricity directed to an external load. The stationary genset power system may also include a turbine fluidly connected to the exhaust outlet of the combustion engine, a compressor operatively driven by the turbine to compress combustion air directed to the air inlet of the combustion engine, and a secondary generator operatively driven by the turbine to produce electricity directed to the external load. The stationary genset power system may further include a controller in communication with the primary and second generators. The controller may be configured to synchronize an electrical power output of the secondary generator with an electrical power output of the primary generator prior to connection of the secondary generator to the external load.

In another aspect, the present disclosure is directed toward another stationary genset power system. This stationary genset power system may include a combustion engine configured to produce a mechanical output, a high-voltage synchronous generator driven by the combustion engine to convert the mechanical output to electricity directed to an external load, and a turbocharger connected to receive exhaust from the combustion engine and to compress combustion air. The stationary genset power system may also include a low-voltage variable speed generator operatively driven by the turbocharger to produce electricity directed to the external load, and a controller in communication with the high-voltage synchronous and low-voltage variable speed generators. The controller may be configured to synchronize an electrical power output of the low-voltage variable speed generator with an electrical power output of the high-voltage synchronous generator prior to connection of the low-voltage variable speed generator to the external load.

In yet another aspect, the present disclosure is directed toward a method of producing power. The method may include combusting a mixture of fuel and air to produce a mechanical power output, converting a majority portion of the mechanical power output to a first electrical power output, and directing the first electrical power output to an external load. The method may also include converting energy from an exhaust flow resulting from the combusting of the mixture of fuel and air to mechanical power at a single location, utilizing a portion of the mechanical power to compress combustion air, and utilizing a remaining portion of the mechanical power to generate a second electrical power output. The method may further include synchronizing the second electrical power output with a first electrical power output, and directing the synchronized second electrical power output to the external load.

BRIEF DESCRIPTION OF THE DRAWING

FIG. 1 is a pictorial illustration of one exemplary disclosed power system.

DETAILED DESCRIPTION

FIG. 1 illustrates a power system 10 configured to supply electricity to an external load 12. Power system 10 may embody, for example, a stationary land-based power plant. In the embodiment of FIG. 1, external load 12 may include any device or devices that require uninterrupted electricity to perform one or more tasks, including, but not limited to, electric lights, consumer devices, and industrial drive motors. In some embodiments, external load 12 may require electric power in a particular form, such as three-phase alternating current having a frequency of 50 or 60 Hz. Power system 10 may include a generator set (genset) 14 operable to generate electricity in the required form, and a power-transmission network such as a common bus 16 for transferring electricity from genset 14 to external load 12.

Genset 14 may include an engine 18 drivingly coupled to a generator 20. Engine 18 may be any type of heat engine operable to produce mechanical power by combusting a mixture of air and fuel, including, for example, a diesel engine, a heavy fuel engine, a gasoline engine, and a gaseous fuel-powered engine. Engine 18 may include components that cooperate to direct combustion air into engine 18 and to exhaust combustion byproducts from engine 18. For example, engine 18 may include at least one main turbocharger 22 having a compressors 24 connected to and driven by a turbine 26. In one example, engine 18 may include only a single turbocharger 22. Both compressor 24 and turbine 26 may be supported by a common driveshaft 28.

Turbine 26 may be a fixed or variable geometry turbine having any number of volutes and being configured to receive exhaust from an exhaust outlet 30 of engine 18. As the hot exhaust gases exiting engine 18 move through turbine 26 and expand against blades (not shown) therein, turbine 26 may rotate and drive the connected compressor 24 via driveshaft 28 to pressurize air directed into engine 18 via an air inlet 32. In one embodiment, turbine 26 may be oversized relative to compressor 24. That is, throughout an operational range of engine 18, turbine 26 may provide a greater mechanical power output than consumed by compressor 24 to pressurize the air to desired levels.

The extra mechanical power output from turbine 26 (i.e., the mechanical output not consumed by compressor 24) may be converted to electricity directed to external load 12 and/or to other on- or off-board auxiliary loads 36. Specifically, power system 10 may include a secondary or auxiliary generator 34. In one embodiment, auxiliary generator 34 may be a low-voltage (e.g., about 4,000 V or lower), variable speed generator operatively coupled to and driven by driveshaft 28. In this manner, as driveshaft 28 is rotated by turbine 26, auxiliary generator 34 may absorb and convert the extra mechanical power output to electricity directed to external load 12 and/or to auxiliary load 36 via an internal bus 38. Auxiliary generator 34 may have an electricity production capacity of about 10-20% of the electricity production capacity of main generator 20.

Generator 20 may be any type of power producing device mechanically coupled to receive power from engine 18 and to convert at least a portion of that mechanical power into electricity. In one embodiment, generator 20 may be the main generator configured to convert a majority portion of the mechanical power output of engine 18 to electricity. For example, generator 20 may embody a high-voltage (e.g., about 4,000 V or higher) AC synchronous generator having a rotor (not shown) directly coupled to a crankshaft 21 of engine 18. In one embodiment, generator 20 may include multiple pairings of poles (not shown), each pairing having three phases arranged on a circumference of a stator (not shown) to produce an alternating current with a frequency of 50 or 60 Hz as the rotor is driven to rotate by the mechanical output of engine 18.

Power system 10 may also include a synchronizing and load sharing controller 40 to regulate operation of power system 10. Controller 40 may include commonly known components that cooperate to synchronize the electrical output of auxiliary generator 34 and main generator 20, and to combine the output into a common supply of power directed to external load 12 and/or to auxiliary load 36 by way of common bus 16. For example, controller 40 may include, among other things, a power electronics module 42 and a transformer module 44 connected between internal bus 38 and common bus 16 to selectively synchronize, condition, and/or connect the electrical output from one or both of auxiliary and main generators 20, 34 to common and/or internal buses 16, 38. Controller 40 may further include commonly known sensing devices (not shown) required to receive input regarding monitored characteristics of electricity generated by each of main and auxiliary generators 20, 34 such as a current, frequency, phase, and/or voltage. Additionally, controller 40 may receive information relating to an amount of power required by external load 12 and/or auxiliary load 36. For example, controller 40 may receive information such as the current, frequency, phase, and/or voltage along one or more portions of common bus 16 and internal bus 38, and/or the current, frequency, phase, and/or voltage in one or more components of external load 12 and/or auxiliary load 36.

In some embodiments, additional components may be associated with controller 40 to enhance the functionality of auxiliary generator 34 and turbocharger 22. Specifically, controller 40 may further include an energy storage module 46 and/or a braking resister module 48. With these modules, controller 40 may effectively operate auxiliary generator 34 as a motor (i.e., auxiliary generator 34 may be a motor/generator) to drive turbocharger 22 to compress more air or to slow turbocharger 22 to compress less air. Specifically, in some circumstances, it may be possible that turbocharger 22 responds to a demand for increased boost pressure slower than desired. In these circumstances, power from energy storage module 46 and/or from main generator 20 may be directed to auxiliary generator 34 to thereby motor turbocharger 22 at an increased speed. In other circumstances, it may be possible that turbocharger 22 responds to a demand for decreased boost pressure slower than desired. In these circumstances, braking resistor module 48 may be used to quickly absorb power from auxiliary generator 34, thereby adding braking torque to driveshaft 28 that helps to slow turbocharger 22.

INDUSTRIAL APPLICABILITY

The disclosed power system may have application in stationary electric power generation, where efficiency may be a concern. The disclosed power system may improve efficiency by converting a portion of the naturally occurring exhaust heat and pressure to electricity that may be used to power an external load. During operation of the disclosed power system, electrical synchronizing and transforming may be performed to produce a common electrical power supply from a main high-voltage AC synchronous generator and an auxiliary low-voltage variable speed generator driven by an existing turbocharger used to compress combustion air. Because power system 10 may utilize a single existing turbocharger to provide both compressed air to engine 18 and to generate electricity, power system 10 may be compact and simple.

It will be apparent to those skilled in the art that various modifications and variations can be made in the disclosed power system and method without departing from the scope of the disclosure. Other embodiments of the disclosed power system will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A stationary genset power system, comprising:
    a combustion engine having an air inlet and an exhaust outlet and being configured to produce a mechanical output;
    a main generator driven by the combustion engine to convert a majority portion of the mechanical output to electricity directed to an external load;
    a turbine fluidly connected to the exhaust outlet of the combustion engine;
    a compressor operatively driven by the turbine to compress combustion air directed to the air inlet of the combustion engine, the turbine being oversized relative to the compressor such that the compressor may provide a desired amount of boost during rated conditions without consuming all of a mechanical power output from the turbine;
    a secondary generator operatively driven by the turbine to produce electricity directed to the external load; and
    a controller in communication with the main and second generators, the controller being configured to synchronize an electrical power output of the secondary generator with an electrical power output of the main generator prior to connection of the secondary generator to the external load.

2. The stationary genset power system of claim 1, wherein the turbine is the sole turbine configured to receive all exhaust from the combustion engine.

3. The stationary genset power system of claim 1, wherein the main generator is a high-voltage synchronous generator, and the secondary generator is a low-voltage variable speed generator.

4. The stationary genset power system of claim 1, wherein the controller includes a power electronics module and a transformer module.

5. The stationary genset power system of claim 1, wherein the secondary generator is a motor/generator further configured to selectively motor the turbine.

6. The stationary genset power system of claim 5, further including a power storage module in communication with the secondary generator.

7. The stationary genset power system of claim 1, further including a braking resistor module in communication with the secondary generator.

8. The stationary genset power system of claim 1, wherein a power output of the secondary generator is about 10-20% of a power output of the main generator.

9. A stationary genset power system, comprising:
    a combustion engine configured to produce a mechanical output;
    a high-voltage synchronous generator driven by the combustion engine to convert the mechanical output to electricity directed to an external load;
    a turbocharger connected to receive exhaust from the combustion engine and compress combustion air;
    a low-voltage variable speed generator operatively driven by the turbocharger to produce electricity directed to the external load; and
    a controller in communication with the high-voltage synchronous and low-voltage variable speed generators, the controller being configured to synchronize an electrical power output of the low-voltage variable speed generator with an electrical power output of the high-voltage synchronous generator prior to connection of the low-voltage variable speed generator to the external load.

10. The stationary genset power system of claim 9, wherein the turbocharger is the sole turbocharger configured to receive all exhaust from the combustion engine.

11. The stationary genset power system of claim 9, wherein the turbocharger is oversized to simultaneously provide a desired amount of boost during rated conditions and to drive the low-voltage variable speed generator.

12. The stationary genset power system of claim 9, wherein the controller includes a power electronics module and a transformer module.

13. The stationary genset power system of claim 9, wherein the low-voltage variable speed generator is a motor/generator configured to selectively motor the turbocharger.

14. The stationary genset power system of claim 13, further including a power storage module in communication with the low-voltage variable speed generator.

15. The stationary genset power system of claim 9, further including a braking resistor module in communication with the low-voltage variable speed generator.

16. The stationary genset power system of claim 9, wherein a power output of the low-voltage variable speed generator is about 10-20% of a power output of the high-voltage synchronous generator.

17. The stationary genset power system of claim 9, wherein the high-voltage synchronous generator is configured to convert a majority portion of the mechanical output of the combustion engine to electricity.

18. A method of producing power utilizing a high-voltage synchronous generator and a low-voltage variable speed generator, comprising:
    combusting a mixture of fuel and air to produce a mechanical power output;
    converting a majority portion of the mechanical power output to a first electrical power output utilizing the high-voltage synchronous generator;
    directing the first electrical power output to an external load;
    converting energy from an exhaust flow resulting from the combusting of the mixture of fuel and air to mechanical power at a single location;
    utilizing a portion of the mechanical power to compress combustion air;
    utilizing a remaining portion of the mechanical power to generate a second electrical power output utilizing the low-voltage variable speed generator;
    synchronizing the second electrical power output with the first electrical power output; and
    directing the synchronized second electrical power output to the external load.

19. The method of claim 18, further including:
    storing a portion of the second electrical power output; and
    directing at least one of the portion of the second electrical power output and a portion of the first electrical power output to increase an amount of air available for combustion.

* * * * *